United States Patent
Laroche et al.

(10) Patent No.: US 8,401,269 B2
(45) Date of Patent: Mar. 19, 2013

(54) SYSTEM AND METHOD FOR AUTOMATIC MEASUREMENTS AND CALIBRATION OF COMPUTERIZED MAGNIFYING INSTRUMENTS

(75) Inventors: Sylvain Laroche, Verdun (CA); Clement Forget, Boucherville (CA)

(73) Assignee: Clemex Technologies Inc., Longueuil (CA)

( * ) Notice: Subject to any disclaimer, the term of this patent is extended or adjusted under 35 U.S.C. 154(b) by 1131 days.

(21) Appl. No.: 11/685,300

(22) Filed: Mar. 13, 2007

(65) Prior Publication Data

US 2007/0211243 A1 Sep. 13, 2007

Related U.S. Application Data

(60) Provisional application No. 60/781,335, filed on Mar. 13, 2006.

(51) Int. Cl.
*G06K 9/00* (2006.01)
*G06K 9/36* (2006.01)
*G01N 23/00* (2006.01)
*G21K 7/00* (2006.01)

(52) U.S. Cl. ........ 382/141; 382/148; 382/286; 250/307; 250/311

(58) Field of Classification Search .......... 382/141–152, 382/286; 250/307, 311
See application file for complete search history.

(56) References Cited

U.S. PATENT DOCUMENTS

| | | | | | |
|---|---|---|---|---|---|
| 4,055,376 | A | * | 10/1977 | Daberko | 356/616 |
| 5,578,745 | A | * | 11/1996 | Bayer et al. | 73/1.73 |
| 5,715,326 | A | * | 2/1998 | Ortyn et al. | 382/128 |
| 5,991,462 | A | * | 11/1999 | Ortyn et al. | 382/286 |
| 6,355,919 | B1 | * | 3/2002 | Engelhardt | 250/201.3 |
| 6,381,013 | B1 | * | 4/2002 | Richardson | 356/305 |
| 6,384,408 | B1 | * | 5/2002 | Yee et al. | 250/252.1 |
| 6,459,482 | B1 | | 10/2002 | Singh et al. | |
| 6,570,157 | B1 | | 5/2003 | Singh et al. | |
| 6,591,658 | B1 | | 7/2003 | Yedur et al. | |
| 6,608,294 | B2 | * | 8/2003 | Nikitin et al. | 250/201.3 |
| 6,664,532 | B2 | * | 12/2003 | Yeremin et al. | 250/216 |
| 6,686,587 | B2 | * | 2/2004 | Nikitin et al. | 250/237 G |
| 6,704,102 | B2 | * | 3/2004 | Roelke | 356/243.1 |
| 6,770,868 | B1 | | 8/2004 | Bevis et al. | |
| 6,807,314 | B1 | * | 10/2004 | Nikitin et al. | 382/255 |

(Continued)

FOREIGN PATENT DOCUMENTS

| | | |
|---|---|---|
| EP | 2202686 A1 | 6/2010 |
| WO | 9308737 A1 | 5/1993 |

OTHER PUBLICATIONS

English Abstract of JP2003319372; Published Nov. 7, 2003.

*Primary Examiner* — Aaron W Carter
(74) *Attorney, Agent, or Firm* — Bereskin & Parr LLP

(57) ABSTRACT

The present invention relates to a system and method for automatic measurements and calibration of computerized magnifying instruments. More particularly, the method includes an automatic calibration aspect, which includes obtaining an optimized digital image of a reference object including at least one standardized landmark feature, and establishing calibration parameters based on one or more measured attributes of the landmark feature. The method further describes a calibration aspect, which includes providing calibration parameters, obtaining a digital image including at least one known attribute, measuring the at least one known attribute and comparing the measured value with the known value. The method further includes an aspect of automatic measurement of an attribute of one or more object, which includes retrieving calibration parameters, acquiring a digital image and measuring the attribute. The system includes an object support, a reference object including one or more standardized landmark features, and an automatically readable identification means.

19 Claims, 6 Drawing Sheets

U.S. PATENT DOCUMENTS

| | | | |
|---|---|---|---|
| 6,861,181 B1 | 3/2005 | Henderson | |
| 6,875,982 B2 * | 4/2005 | Bedell et al. | 250/307 |
| 7,199,360 B1 * | 4/2007 | Montagu | 250/252.1 |
| 7,209,596 B2 * | 4/2007 | Nikitin | 382/255 |
| 7,291,849 B1 * | 11/2007 | Baiocchi et al. | 250/491.1 |
| 7,361,898 B2 * | 4/2008 | Mizuno et al. | 250/331 |
| 7,361,941 B1 * | 4/2008 | Lorusso et al. | 257/100 |
| 7,420,168 B2 * | 9/2008 | Mizuno et al. | 250/311 |
| 8,054,447 B2 * | 11/2011 | Nagasaka et al. | 355/53 |
| 2002/0067855 A1 | 6/2002 | Chiu et al. | |
| 2002/0179829 A1 * | 12/2002 | Nikitin et al. | 250/237 G |
| 2002/0181660 A1 | 12/2002 | Reinstein et al. | |
| 2003/0034437 A1 | 2/2003 | Yeremin et al. | |
| 2003/0071191 A1 * | 4/2003 | Nikitin et al. | 250/201.3 |
| 2005/0045819 A1 * | 3/2005 | Bedell et al. | 250/307 |
| 2005/0109925 A1 * | 5/2005 | El Rifai et al. | 250/234 |
| 2005/0161601 A1 | 7/2005 | Kochi et al. | |
| 2005/0189501 A1 | 9/2005 | Sato et al. | |
| 2005/0220362 A1 * | 10/2005 | Nikitin | 382/286 |
| 2005/0248656 A1 * | 11/2005 | Zahorsky | 348/188 |
| 2005/0285035 A1 | 12/2005 | Mizuno et al. | |
| 2007/0211243 A1 * | 9/2007 | Laroche et al. | 356/243.1 |
| 2008/0023627 A1 * | 1/2008 | Mizuno et al. | 250/252.1 |
| 2008/0067447 A1 * | 3/2008 | Nakayama | 250/492.22 |
| 2008/0076967 A1 * | 3/2008 | Couvillon, Jr. | 600/117 |
| 2008/0210867 A1 * | 9/2008 | Hitomi et al. | 250/311 |
| 2008/0272297 A1 * | 11/2008 | Mizuno et al. | 250/307 |

* cited by examiner

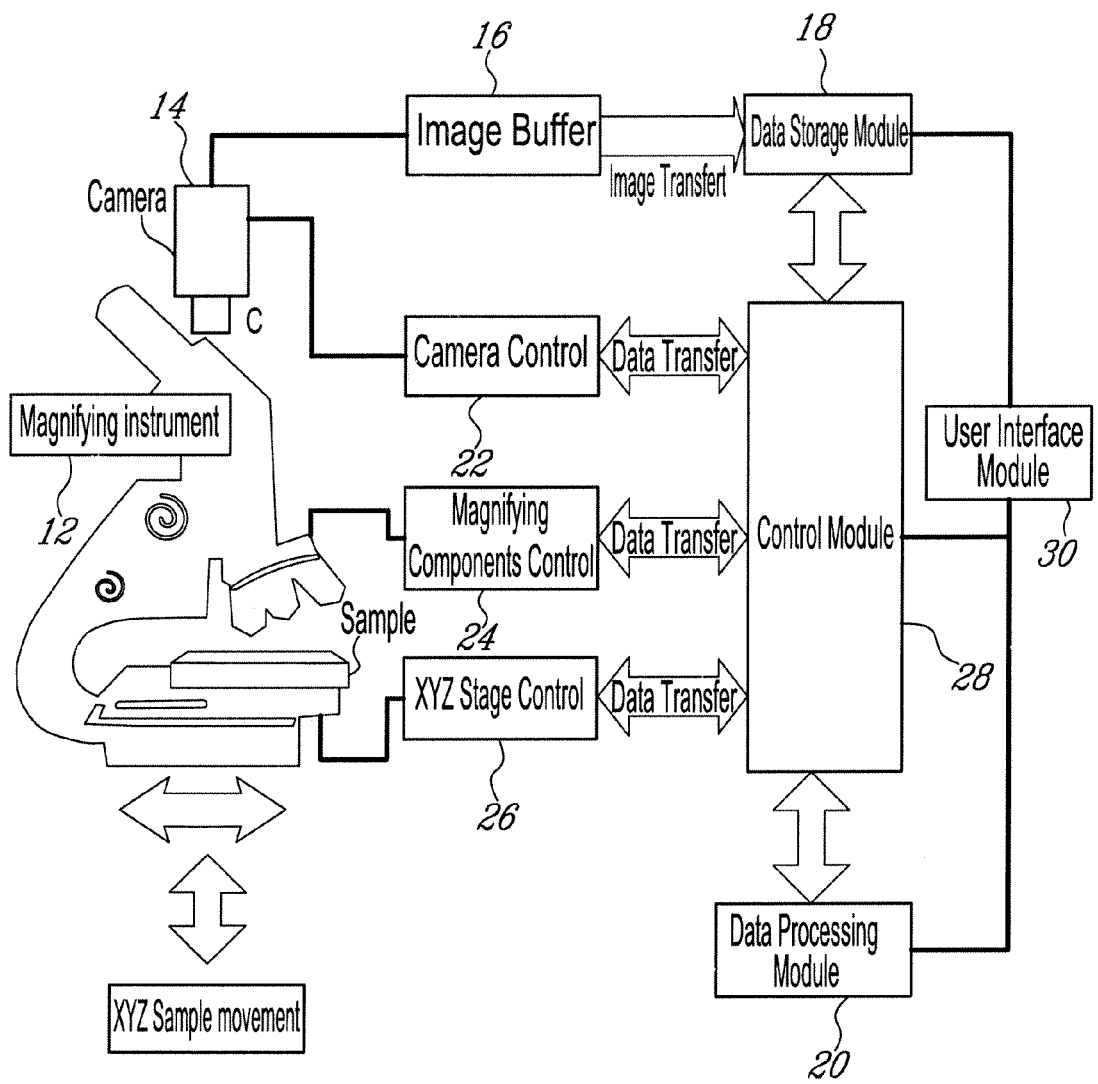

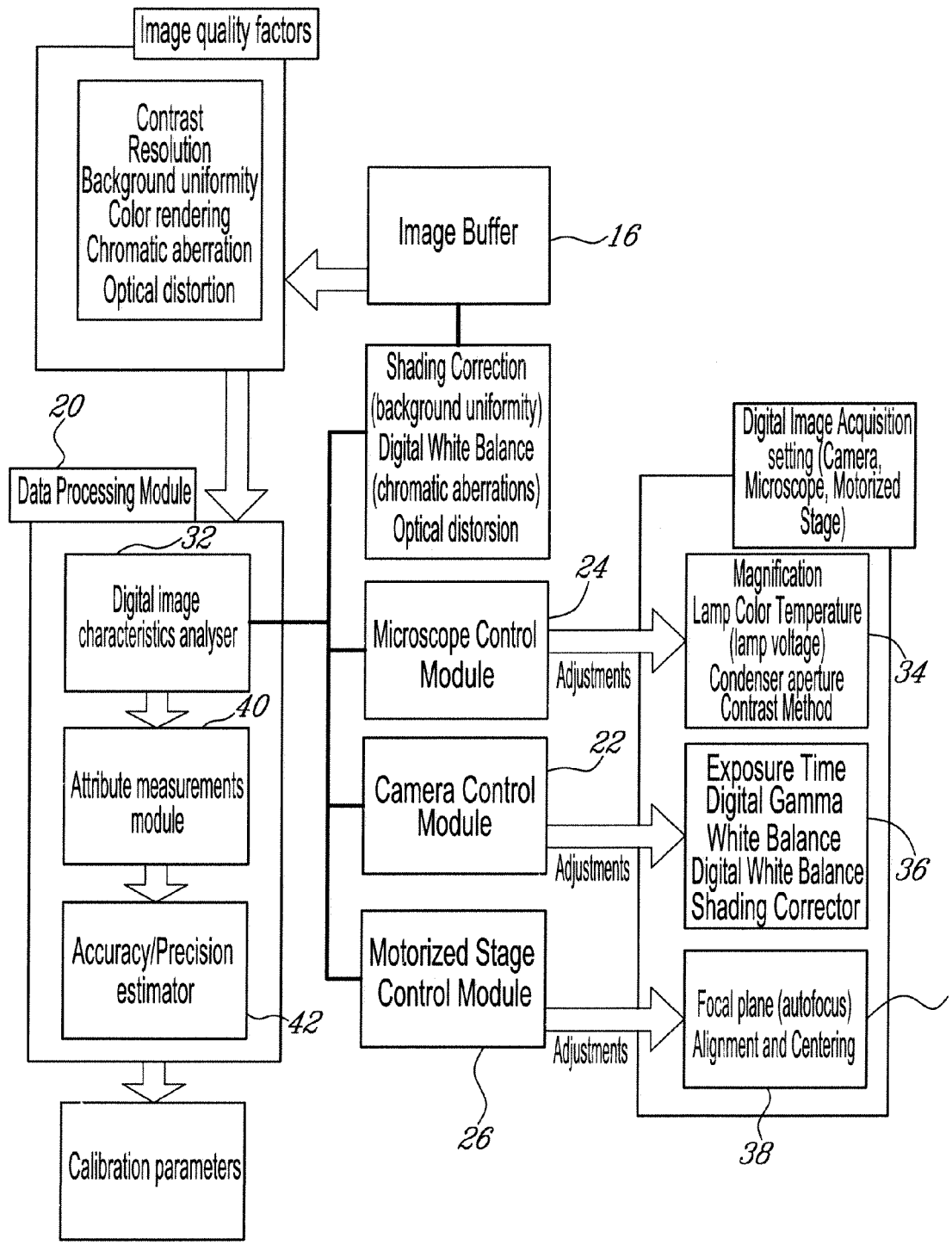

SYSTEM AND METHOD FOR AUTOMATIC MEASUREMENTS AND CALIBRATION OF COMPUTERIZED MAGNIFYING INSTRUMENTS

CROSS-REFERENCE TO RELATED APPLICATION

This application claims priority from U.S. provisional application No. 60/781,335 filed Mar. 13, 2006 entitled System and Method for Automatic Measurements and Calibration of Computerized Magnifying Instruments.

FIELD OF THE INVENTION

The invention relates to automatic measurements, calibration and validation of computerized magnifying instruments.

BACKGROUND OF THE INVENTION

Magnifying systems such as microscopic imaging systems are commonly used for conducting research, quantitative characterization and screening in various applications, such as semi-conductors fabrication, pharmaceutical research, biomedical and biotechnology laboratories, aerospace and automotive parts manufacturing. The measurements of attributes characterizing the elements present in microscopic images, finds applications in materials science and in pharmaceutical and biotechnological research. In order to compute accurately and precisely such attributes that accurately and truly reflect the spatial properties of the elements being imaged, a microscopic imaging system must be calibrated beforehand. This process establishes calibration parameters by measuring a reference object image having known attributes such as its physical dimension and shape. The nature of the calibration parameters can be quite complex, as their purpose is to compensate for all types of deformations and inhomogeneities induced by the entire imaging system, including non-linear effects due to all the optical/photoelectronic sub-components.

A typical calibration method requires the user to measure on a computer screen, using interactive image processing software tools, the distances between various elements of the image of a reference calibration pattern, as well as to compute other image characteristics using these same tools. This process is repeated for each magnification of the imaging system and requires each time from the user new adjustments of the microscope, photoelectronic sensor and the digital acquisition parameters. The calibration process generally requires the user to precisely identify the position of sharp edges, a task that is inherently subjective and that provides highly variable results between individuals, and also from the same individual at different times.

The accuracy and precision of the measurements of a microscopic imaging system are directly affected by the variability of the calibration process. Attempts to reduce this variability and uncertainties include restricting the performance of the calibration steps to a few trained users that thoroughly understand the details of the calibration methods, and averaging calibration results obtained at different times in order to reduce variability. The complexity of these procedures is a factor that prevents a broader adoption of computerized magnifying measurement systems, as they are still considered as complex and sophisticated tools that require a dedicated technical expertise to be properly operated. Thus better calibration and measurement methods are needed, as well as improved ways to characterize and validate the calibration results.

SUMMARY OF THE INVENTION

The present invention aims at overcoming some of the drawbacks of present magnifying measurement systems such as microscopic imaging systems by providing systems and methods where calibration and specimen analysis is performed automatically, without user intervention. The present invention also automatically validates its own calibration, also without user intervention. This additional validation steps makes the method more robust and less prone to errors. The benefits of the present invention are the automatic production of repeatable and less variable calibration parameters, a simplification of the calibration process for the user, a reduction, and possibly elimination, of the number of specimen slide manipulations. The method minimizes the uncertainties of the calibration procedure and therefore improves the reliability of quantitative magnifying imaging systems used as digital measurement instruments. These are all elements that are expected to lead to a broader adoption and a wider use of computerized quantitative magnifying measurement systems.

Thus in one embodiment there is provided a computer-implemented method for automatic calibration of a magnifying measurement system the method comprising: obtaining, an optimized digital image of a reference object comprising at least one standardized landmark feature identifiable by pattern recognition; and establishing calibration parameters based on one or more measured attribute of the at least one standardized landmark features, image acquisition settings and image characteristics.

In another embodiment there is provided a computer-implemented method for automatic validation of a calibration of a magnifying measurement system, the method comprising: providing calibration parameters; obtaining a digital image of one or more object comprising one or more attribute of known value; measuring the one or more attribute to generate a measured value; comparing the measured value with the known value; and wherein the system is validated when the measured value is within a predetermined range comprising the known value.

In yet another embodiment there is provided a computer implemented method for automatic measurement of an attribute of one or more object using a magnifying measurement system, the method comprising: retrieving calibration parameters: acquiring a digital image of the object in accordance with the calibration parameters; and measuring the attribute.

In another aspect of the invention there is provided an automatized magnifying measurement system comprising: a stage to position a sample; image acquisition settings controller image acquiring means for acquiring a magnified digital image of the sample; and data processing module to measure one or more attributes of the sample.

In the present description by the term magnifying measurement system it is meant instruments used for magnifying objects such as microscopes and stereoscopes. All types of such instruments are included in the definition such as but not limited to light microscopes, scanning electron microscopes, transmission electron microscopes and the likes.

By attributes it is meant characteristics of an object such as its size, shape, texture and the like.

By digital image characteristics (or image characteristics) it is meant parameters affecting aspects of the image such as but not limited to contrast, color, intensity, magnification, resolution, background uniformity, chromatic aberrations, optical distortion.

By settings or system settings it is meant system configuration including but not limited to settings of the magnifying components such as focal plane and objective power, camera parameters (shutter speed, white balance, digital gamma correction, etc . . . ), illuminating system (lamp voltage), digital shading correction for illuminating inhomogeneity and the like.

By automatic (automatically, automatized) it is meant substantially without user intervention.

BRIEF DESCRIPTION OF THE DRAWINGS

Further features and advantages of the present invention will become apparent from the following detailed description, taken in combination with the appended drawings, in which:

FIG. 1 is a schematic diagram of an embodiment of the system of the invention;

FIG. 2 is a schematic diagram of another embodiment of the system of the invention;

FIG. 3-b is an illustration of the reference object of the calibration slide, comprising nested rectangles;

DETAILED DESCRIPTION OF THE INVENTION

Figure 3A:
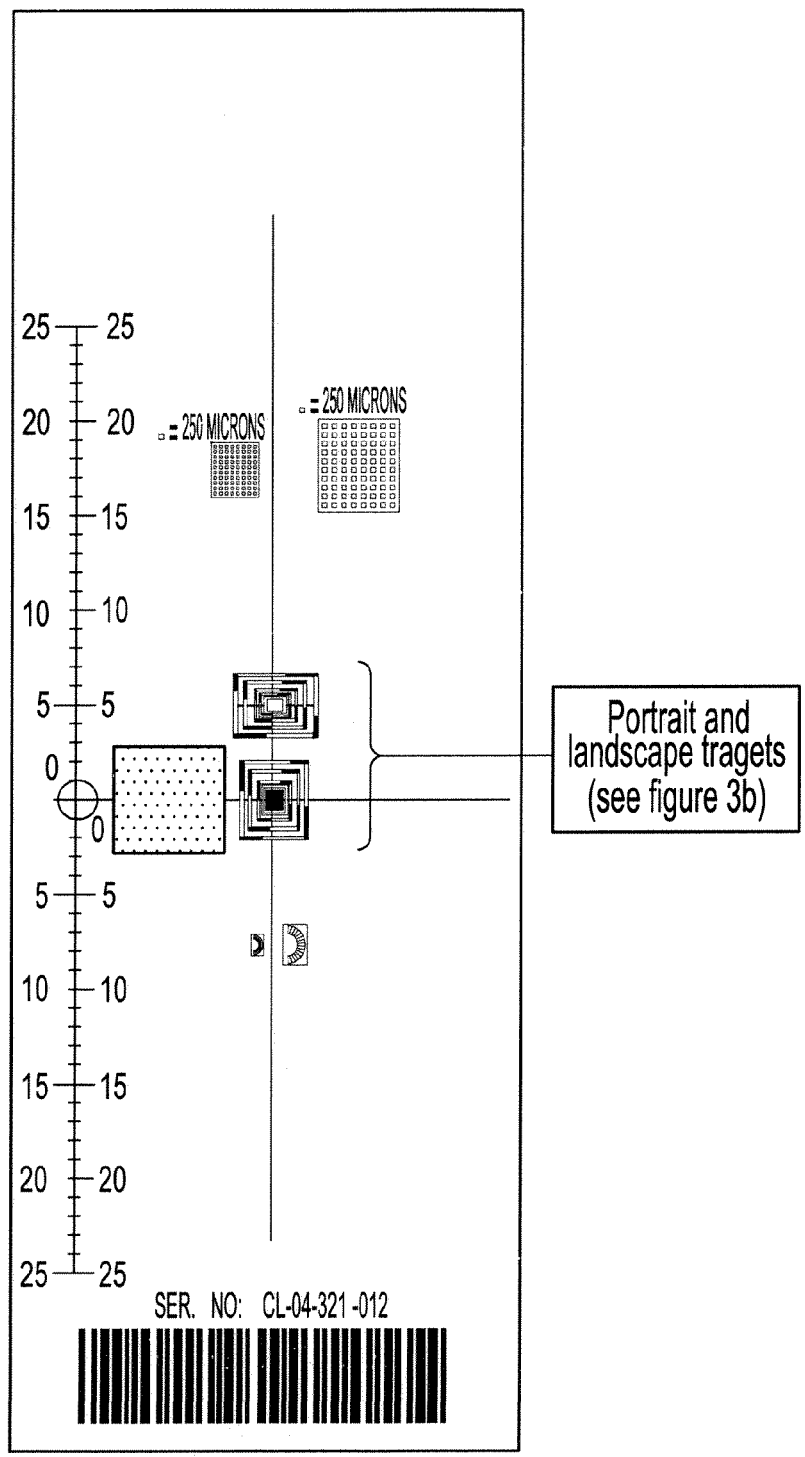
FIG. 3-a is the illustration of a reference calibration slide.

The present invention relates to a method and apparatus for measurements of objects attributes using a computerized magnifying measurement system such as a microscope.

In one aspect of the invention the system is calibrated automatically, that is to say substantially without user intervention thereby eliminating calibration errors introduced by user manipulations and subjectivity.

The calibration begins by obtaining an optimized digital image of an object comprising standardized landmark features. The dimensions of the standardized landmark features on a reference slide, traceable to real physical dimensions obtained from a standardized external measurement process, are archived in a database. The database contains an entry for each unique reference slide identified by a unique Serial Number. The serial number itself is recognized by the computerized imaging system to ensure the traceability of the calibration process The digital image is then automatically processed to locate and identify the landmark features and to measure selected attributes of the features. In a preferred embodiment, in order to acquire precise measurements of the landmark features, the settings of the system and the characteristics of the image are adjusted until the digital image allows for accurate and precise recognition of the landmark features using a pattern recognition algorithm thereby allowing precise and accurate measurements of the features to be obtained. The uncertainties of that process are also estimated. The measurements of the attributes of the standardized features are preferably performed when the image has been optimized to allow a desired degree a precision and accuracy. It will be appreciated that adjustment of the digital image may be an iterative process involving the interdependent adjustment of digital image characteristics and image acquisition settings at several different magnifications.

From measurements of the attributes and from known values of the standardized landmark features, calibration parameters are established and can be retrieved when measuring actual sample. The calibration parameters are dependent on and therefore comprise the acquisition image settings with which the digital image of the standardized features has been acquired, the correction parameters applied to the characteristics of the digital image and the actual measurements of the attributes.

In a preferred embodiment all the steps involved in the calibration are automatic in that they do not require input from the user. In this respect, the object comprising the standardized landmarks features (the "standard") should preferably allow calibration of all attributes that will be measured in the actual samples at all acquisition settings. It will be appreciated however that several standards each comprising different features with different attributes can also be used.

The object comprising the standardized features is preferably suitable to perform calibration at several image acquisition settings including several magnification powers. Thus, the standard should comprise different features that are preferably recognized by pattern recognition tools at different magnifications. The ability of the system to calibrate and measure at different magnifications enables measurements at different degrees of precision, accuracy and resolution.

In another aspect of the invention the system also allows for automatic validation of the calibration. Objects representative of typical quantitative measurement application, with attributes of known values are provided and measured. In a preferred embodiment a statistically significant number of objects are measured. The statistical distributions of the measured attribute values are compared with the known distribution of values, obtained from an external and standardized measurement process, to determine the validity of the calibration. If the measured values of the attributes fall within the acceptance range, determined by the estimated overall uncertainties the calibration is considered valid.

The validation may also comprise different reference standard slide with several objects. The analysis generates a statistical distribution of sizes and shapes for a large population of known physical objects. Auto-verification of the performance of the imaging system and possible auto-detection of a false erroneous calibration parameters. Since the reference slide of known objects have been independently measured and certified with a traceable method, a prior erroneous calibration parameters can be automatically detected as the statistical size distribution depends on them. The comparison of the measured distribution and the corresponding one retrieved from the traceable database will allow such validation scheme.

The system also provides for automatic image acquisition processing and measurement of samples. The procedure comprises acquisition of digital images of the sample which can be analyzed to measure attributes of different objects in the sample. Measurement of the samples relies on calibration parameters that are used to acquire the image and obtain the measurements of the attributes (size and shape).

The method also encompasses an embodiment in which the calibration, validation and measurement are automatically performed in sequence without user input. Alternatively only the calibration or validation may be performed in combination with the measurement of the sample (or samples).

It will be appreciated that all results of calibration and measurements may be expressed with an associated estimated uncertainties whenever a quantitative measure is obtained.

It will be appreciated that all events occurring as a calibration or validation procedure is performed is automatically logged into the computerized system in order to allow audits and traceability.

The system of the invention is generally described in FIG. 1 wherein object or sample 10 to be analyzed is positioned such as to be coupled with the magnifying components of magnifying instrument 12 which produce an image detected by imaging device such as camera 14 and digitized and sent to digital image buffer 16. The digital image data can be stored in data storage module 18. Processing of the data to establish calibration parameters are performed by data processing module 20 which comprises the necessary modules to process the data as will be described below. The system also comprises camera control 22, magnifying components control 24 and stage control 26. Control module 28 provides overall control of the system components and software and is linked to user interface 30.

As shown in FIG. 2 the characteristics of the image (image quality factors) can be analyzed and adjusted by a digital image characteristics adjuster/analyzer 32. The acquisition of images with a desired degree of accuracy requires adjustments of the settings of the system including the magnifying components 34, imaging component 36 and stage position 38. Modules 22, 24 and 26 can adjust these settings taking into account digital image characteristics. An attribute measurements module is provided at 40 to perform attributes measurements on the features of the object using a digital image. There is also provided an accuracy/precision estimator 42 to provide calculations/estimations of statistics related to the attributes measurements and accuracy of the measurements. The accuracy/precision estimator can also be involved in the auto-validation process as described above to compare measured attributes values with known values.

There is now provided a description of an embodiment of the method and apparatus of the invention in which the magnifying subcomponent is a microscope system. The optical element with the desired magnification factor as well as other microscope/camera configuration parameters can be selected, either manually by the user using the microscope interface, either semi-automatically with the user supervising the control module 28. In a preferred embodiment the control module 28 automatically configures the microscopic imaging system. In practice, the control module 28 can issue commands to control any aspect of the system. The data communication is bilateral, as the controls 22, 24 and 26 also send back data to the control module 28, to provide information on the current status and settings of the imaging microscope and on the progress of commands issued by the control module 28.

When object 10 contains a reference calibration pattern, the pattern image is formed by magnifying instrument 12, and the light from this image is transformed into a digital image by camera 14, which can comprise for instance electronic components such as a CCD (Charge Coupled Device) or a CMOS matrix. The digital image thus formed can be a grey-level image, a color image, or any other type of image, and its size can vary depending on specific applicative needs. Once the imaging microscope has reached a state that corresponds to the commands sent by the control module 28, the control module 28 issues commands to transfer the digital image to the image buffer 16. Upon reception of these commands the transfer of the digital image from the CCD matrix to the image buffer 16 is initiated and finally to the data storage module 18. In order to facilitate subsequent processing by the data processing module 20, information sent or received by the control module 28 about the status and the settings of the imaging microscope are also stored in the data storage module 18, along with the corresponding digital image. The data processing module 20 accesses data from the data storage module 18 and automatically computes, according to the present invention, calibration parameters can be stored back to the data storage module 18.

It will be appreciated that the system operations described above can be automatically repeated (that is to say without substantial user intervention) for each configuration of the imaging microscope for which calibration parameters are desired. The calibration parameters thus obtained are stored to the data storage module 18, along with parameters describing the microscopic imaging system configuration and digital image characteristics to which they correspond.

Figure 3B:
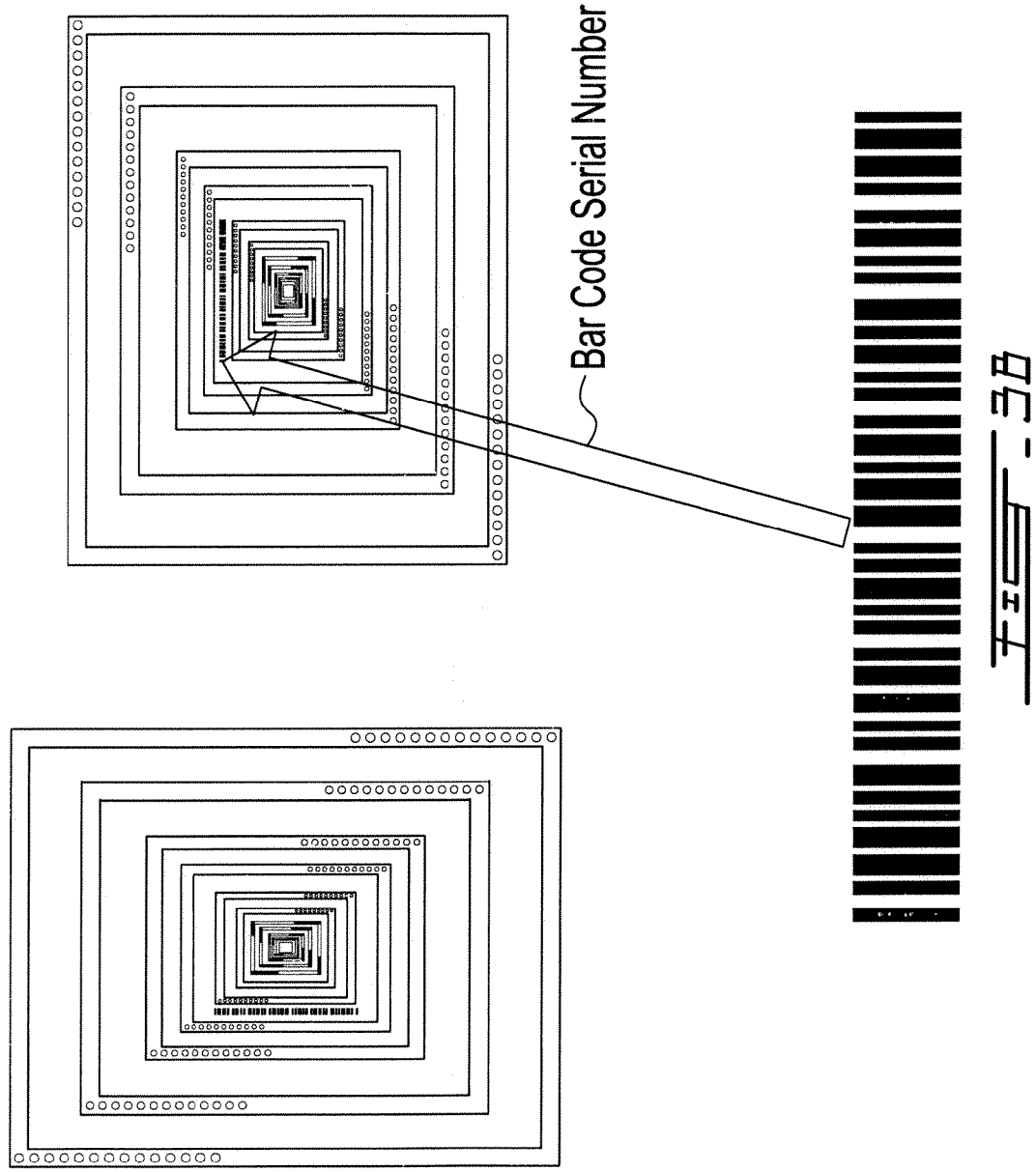

In order to calibrate the system, a calibration slide containing a reference calibration pattern, such as the one illustrated in FIG. 3, is calibrated beforehand by an external calibration process that provides traceable values of attributes of the features such as distances between landmark features of the pattern within a known global estimated uncertainty. In practice, the external calibration process provides measurement values that are sufficiently accurate to be considered as accurate and precise and traceable to a reference system independently calibrated. External calibration can be performed, for instance, by an accredited organization that provides measurements that are obtained by performing standardized and well-recognized measurement methods, in a controlled environment, based on a measurement gold standard. The values obtained from the external calibration process can be stored in the data storage module 18, to be later used by the data processing module 20 for the computation of calibration parameters. Each reference slide externally calibrated is uniquely recognized by a serial number automatically read by the calibration procedure.

The reference calibration slide of FIG. 3 may comprise a unique identifier (serial number). The identification code can take any form that guarantees uniqueness, but preferably takes a form that can easily and automatically be detected by a computer, such as a bar code. The purpose of this identifier is to uniquely associate traceable values from the external calibration process to the appropriate calibration slide. One can consider a situation where, for instance a research laboratory possesses more than one microscopic imaging system, and also possesses more than one calibration slide. It is not very difficult to imagine a situation where a user enters, through the user interface module 30, the traceable values obtained from the external calibration of one of the two slides, while erroneously uses the other calibration slide for calibrating the microscopic imaging system. An embodiment of the present invention advantageously prevents this situation by explicitly storing the unique identifier of the calibration slide with the traceable values from the external calibration process, and by implementing a verification routine that automatically detects the identification code in the image of the calibration reference pattern and verifies that it corresponds to the one associated with the traceable values from external calibration.

It is an object of the present invention to teach a method for the automatic computation of calibration parameters, it is a further object of the present invention to disclose a magnifying imaging system that implements a method for the automatic computation of calibration parameters. The first step of the method, performed by the data processing module 20, is to load the image of the reference calibration pattern from the data storage module 18. The data processing module 20 at this step also retrieves information associated with the reference calibration pattern such as traceable distances obtained from the external calibration process and stored in the data storage module 18. Alternatively, the image and the traceable distance values can be provided to the data processing module 20 by the user, using the user interface module 30.

The user interface module 30 can take numerous forms, including well-known computer interfaces to enter numerical values, or it can take the form of selection lists, sliders, checkboxes, or any other type of software user interface component. The user interface module 30 can also comprise file browsers that allow the user to navigate on its local computer or on a computer network to locate and select computer files that may contain configuration parameters, calibration values, images, or any other type of information. It is an object of the present invention to encompass all combinations of user interfaces 30 and of computer networks that can be used to provide data to the data processing module 20, to the data storage module 18 and to the control module 28.

The following step of the method applies image processing routines to automatically identify landmark features in the image of the reference calibration pattern. These routines implements image processing algorithms such as edge detection and shape detection algorithms at a subpixel level. The landmark features in the image are identified by identification features that are recognized by pattern recognition.

Finally the calibration parameters can be stored to the data storage module 18. The steps are repeated for each configuration of the microscopic imaging systems for which calibration parameters are required, thus providing to the data storage module 18 a set of pre-computed calibration parameters for each configuration of interest of the microscopic imaging system.

A further embodiment of the present invention includes the storage of a unique identifier for the microscopic (or magnifying) imaging system along with the calibration parameters. This unique identifier can take for instance the form of the serial number of the microscope of the imaging system. This information is transmitted to the control module 28 and is stored to the data storage module 18. The verification of the correspondence of the microscopic imaging system identifier with the one stored with the calibration parameters prevents the erroneous use of inappropriate correction parameters.

The computation of the calibration parameters can be made more robust by incorporating error detection steps, where the image of the reference calibration pattern is automatically analyzed by image processing algorithms that are designed to detect error conditions, such as for instance, the use of an empty slide, the use of any slide that do not contain the appropriate reference calibration pattern, the presence of blurring or of non uniform lighting conditions over the image, the absence of sharp contrasts defining the features, the presence of a scratch or of some dust on the reference slide.

Another embodiment of the present invention is to provide automatic sample analysis methods using magnifying imaging systems. A further embodiment of the present invention is to disclose microscopic imaging systems that implement these methods. Once the establishment of the calibration parameters is completed, the magnifying imaging system configuration is adjusted, in accordance to the calibration parameters which are selected based on the features that are to be measured in the sample, either manually by the user, either in a semi automated manner where the user supervises the operations of the control module 28, or in a completely automated manner where the control module 28 automatically configures the microscopic imaging system. Thus for the measurements of the features, the data processing module 20 accesses the data storage module 18 to obtain the appropriate calibration parameters, the ones corresponding to the instrument configuration when the image was acquired. These calibration parameters are taken into account during the measurements of the features. Alternatively, the data processing module 20 can access the calibration parameters from the data storage module 18 once all features are measured, and apply the calibration parameters to the originally computed parameters in order to form calibration-corrected parameters.

The automatic sample analysis method can include a verification step where the serial number of the imaging microscope, or any other means for the unique identification of the imaging microscope, is compared with the serial number or the other identification means that is associated with the calibration parameters that correspond to the imaging microscope configuration.

One skilled in the art can appreciate that the automatic sample analysis method of the present invention can also be used for the calibration of reference calibration pattern slides. This particular embodiment of the present invention is particularly advantageous for instance, for a manufacturer of microscopic imaging system that would provide to each customer a reference calibration pattern slide with each system that is delivered. For various technical and commercial reasons, this manufacturer may not necessarily want to rely on another corporate entity to perform external calibration of each reference calibration slide. With the present invention, the manufacturer only needs one "gold standard" reference calibration pattern slide that has been externally calibrated. He can then calibrate all other reference calibration pattern slides with respect to this "gold standard" by applying the automatic sample analysis method of the present invention.

Figure 4:
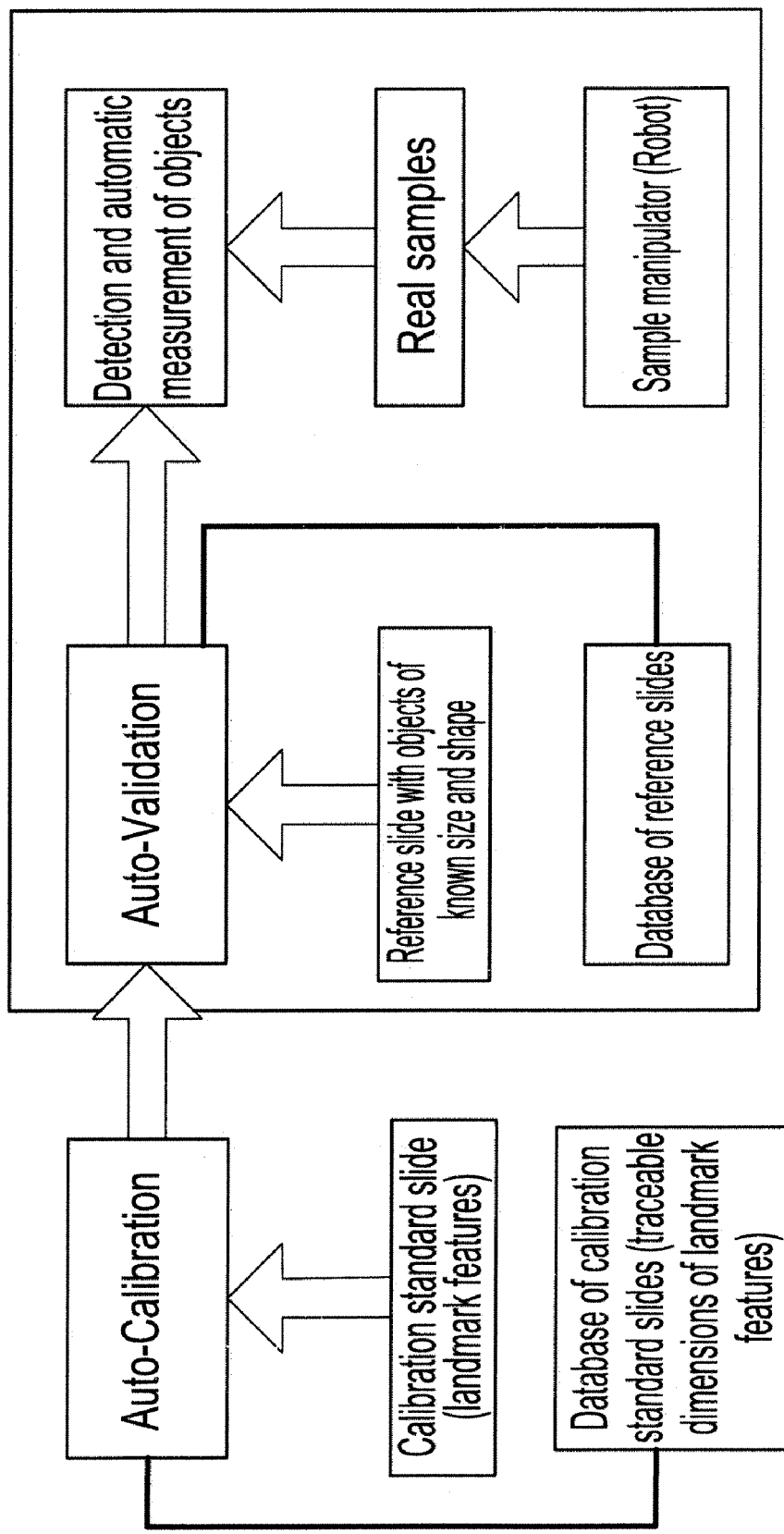
FIG. 4; is a schematic flow chart of an embodiment of the method of the invention.
Figure 5:
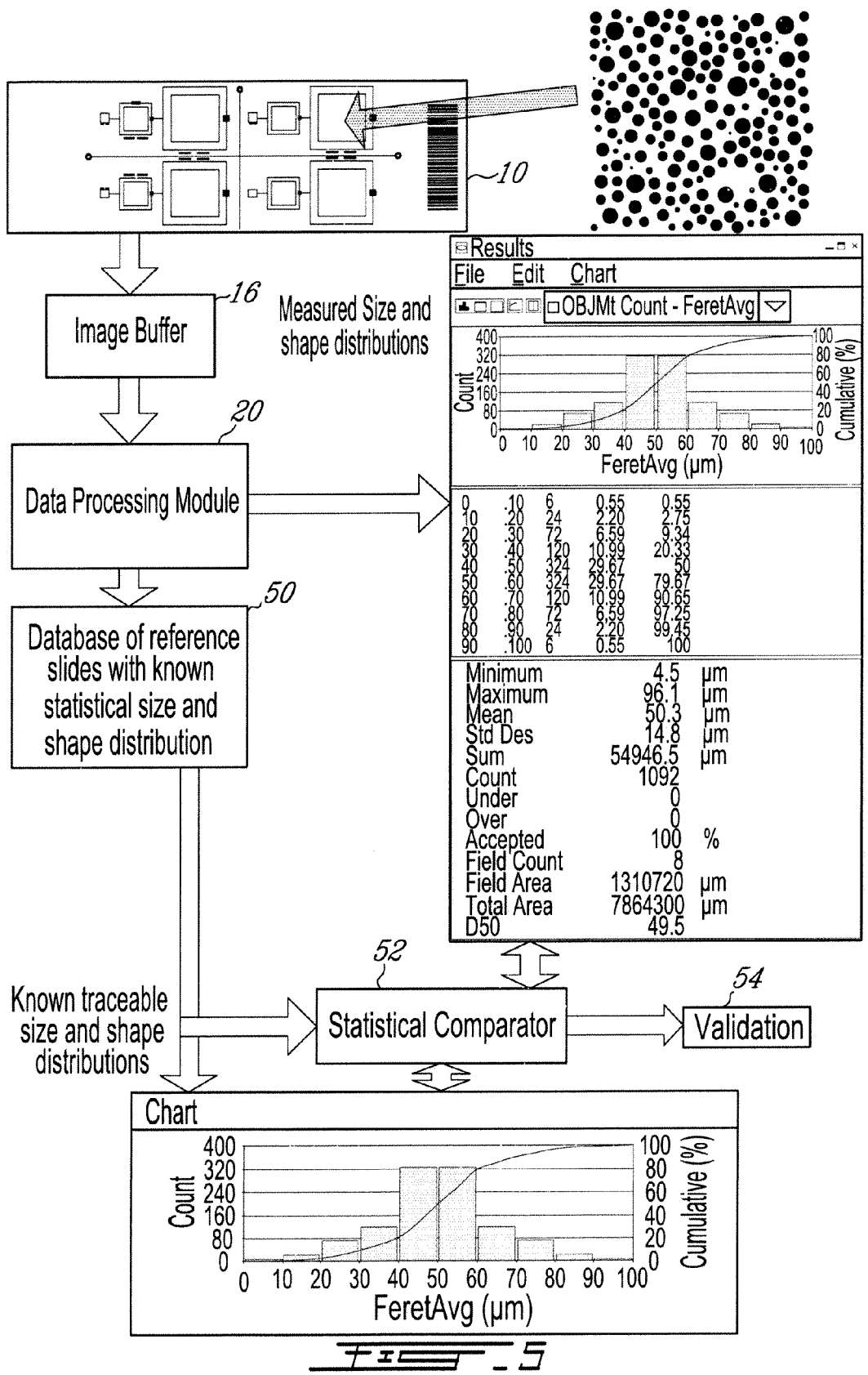
FIG. 5 is a schematic flow chart of an embodiment of the auto-validation.

An embodiment of the automatic validation of the invention is described in FIGS. 4 and 5. With reference to FIG. 4 auto-calibration may optionally precede the auto-validation step which includes the acquisition of an image of a reference slide having objects of known size and shape. Attributes of the features of the objects are automatically measured and compare to the known stored values of the attributes. Measurements of real samples can then proceed. The system may be fully automated by providing a sample manipulator (robot) which can process batch of samples without user intervention. This feature is particularly advantageous when the samples are toxic or otherwise dangerous to manipulate or are easily contaminated.

The autovalidation may be based on statistical measurements of the attributes (FIG. 5). The data processing module 20 can measure the attributes using appropriate statistical models. The results can then be compared with known statistically measured values 50 using statistical comparator 52. The assessment of the validation 54 is then performed and if the measured value are within a predetermined range the system is validated. If not corrective measures such as repeating the calibration step can be performed.

While the invention has been described in connection with specific embodiments thereof, it will be understood that it is capable of further modifications and this application is intended to cover any variations, uses, or adaptations of the invention following, in general, the principles of the invention and including such departures from the present disclosures as come within known or customary practice within the art to which the invention pertains and as may be applied to the essential features herein before set forth, and as follows in the scope of the appended claims.

The invention claimed is:

1. An automatically self-calibrating magnifying measurement system, comprising:
   a) a calibration standard having a reference object with at least two landmark features of differing scales identifiable by pattern recognition at a plurality of magnifications, dimensions of which have been verified and digitally archived in association with a unique identification code for the calibration standard, the landmark features each being associated with a distinctive marking that can be read by pattern recognition to identify the different landmark features, the calibration standard also having a machine readable identification code marker configured to appear in a magnified digital image of the reference object, the identification code marker corresponding to the unique identification code for the calibration standard;

b) a stage to position the calibration standard, and alternatively to position a sample;

c) image acquiring means for acquiring magnified digital images of the reference object, and alternatively for acquiring a magnified digital image of the sample;

d) a data storage module for storing information including the unique identification code for the calibration standard and the associated verified dimensions of the landmark features of the reference object;

e) a control module configured to control the stage and the image acquiring means to obtain digital images of the reference object of the calibration standard at a plurality of magnifications, and alternatively to obtain a digital image of the sample; and f) a data processing module configured to:
  automatically read by pattern recognition at a plurality of magnifications the distinctive markings associated with the landmark features of the reference object of the calibration standard to identify the landmark features;
  automatically measure dimensions of the identified landmark features of the reference object of the calibration standard by pattern recognition at a plurality of magnifications;
  automatically read the identification code marker of the calibration standard by pattern recognition to obtain the unique identification code for the calibration standard, and to retrieve the verified dimensions of the landmark features of the reference object associated with the unique identification code for the calibration standard;
  automatically establish calibration parameters for a plurality of magnifications based on comparing the measured dimensions of the landmark features with the verified dimensions; and
  automatically store the calibration parameters in the data storage module.

2. The automatically self-calibrating magnifying measurement system of claim 1 wherein the identification code marker comprises a bar code.

3. The automatically self-calibrating magnifying measurement system of claim 2 wherein the bar code is replicated at a plurality of different scales.

4. The automatically self-calibrating magnifying measurement system of claim 3 wherein the calibration standard also has the unique identification code marked on is in a form easily read by a human operator.

5. The automatically self-calibrating magnifying measurement system of claim 1 wherein landmark features of the reference object of the calibration standard comprises a plurality of similar figures of varying scale.

6. The automatically self-calibrating magnifying measurement system of claim 5 wherein each of the figures is distinguished with one of the distinctive markings read by the data processing module by pattern recognition.

7. The automatically self-calibrating magnifying measurement system of claim 6 wherein each of the figures is distinguished by a distinct number of sub-markings.

8. The automatically self-calibrating magnifying measurement system of claim 7 wherein the figures comprise a plurality of nesting rectangles.

9. The automatically self-calibrating magnifying measurement system of claim 1 further comprising a computer readable medium containing the unique identification code for the calibration standard and the associated verified dimensions of the landmark features of the reference object.

10. The automatically self-calibrating magnifying measurement system of claim 1, wherein the verified dimensions of the landmark features of the reference object are verified by an external calibration performed by an accredited organization.

11. The automatically self-calibrating magnifying measurement system of claim 1 wherein the data processing module is further configured to automatically validate the calibration parameters by
  measuring one or more attributes of a plurality of objects having attributes of known values by pattern recognition,
  comparing the measured values of the one or more attributes with the known values,
  wherein the system is validated when the measured values are within a predetermined range of the known values.

12. A calibration standard for use with an automatically self-calibrating magnifying measurement system that includes a data storage module for storing information including a unique identification code for the calibration standard and associated verified dimensions of landmark features of a reference object of the calibration standard, and a data processing module configured to automatically read at a plurality of magnifications distinctive markings associated with the landmark features of the reference object of the calibration to identify the different landmark features to measure dimensions of the landmark features of the reference object of the calibration standard, and to automatically read at a plurality of magnifications an identification code marker of the calibration standard, and to retrieve verified dimensions of the identified landmark features of the reference object associated with the unique identification code for the calibration standard, the calibration standard comprising:
  a reference object with at least two landmark features of different scales identifiable and measurable by pattern recognition at a plurality of magnifications, dimensions of which have been verified and digitally archived in association with a unique identification code for the calibration standard, the landmark features each being associated with a distinctive marking that can be read by pattern recognition to identify the different landmark features; and
  a machine readable identification code marker configured to appear in a magnified digital image of the reference object, the identification code marker being replicated at a plurality of different scales and corresponding to the unique identification code for the calibration standard; and
    wherein the identification code marker comprises a bar code.

13. The calibration standard of claim 12 wherein the calibration standard also has the unique identification code marked on it in a form easily read by a human operator.

14. The calibration standard of claim 13 wherein the reference object of the calibration standard comprises a plurality of similar figures of varying scale.

15. The calibration standard of claim 14 wherein each of the figures is distinguished with one of the distinctive markings read by the data processing module by pattern recognition.

16. The calibration standard of claim 15 wherein each of the figures is distinguished by a distinct number of sub-markings.

17. The calibration standard of claim 16 wherein the figures comprise a plurality of nesting rectangles.

18. The calibration standard of claim 12 further comprising a computer readable medium containing the unique identification code for the calibration standard and the associated verified dimensions of the landmark features of the reference object.

19. The automatically self-calibrating magnifying measurement system of claim 1 wherein the data processing module is further configured to measure one or more attributes of a sample by pattern recognition applying the calibration parameters.

* * * * *